United States Patent [19]

Moote et al.

[11] 3,841,405
[45] Oct. 15, 1974

[54] SUBSURFACE FORMATION TREATMENT

[75] Inventors: Truman P. Moote; Roscoe F. Vandaveer, both of Tulsa, Okla.

[73] Assignee: Amoco Production Company, Tulsa, Okla.

[22] Filed: May 22, 1973

[21] Appl. No.: 362,724

[52] U.S. Cl............ 166/294, 61/36 R, 166/270, 166/295
[51] Int. Cl............................................ E21b 33/13
[58] Field of Search............ 61/36 R; 166/270, 281, 166/292, 294, 295, 305 R; 175/72

[56] References Cited
UNITED STATES PATENTS

| | | | |
|---|---|---|---|
| 2,801,698 | 8/1957 | Bond | 166/294 |
| 3,186,482 | 6/1965 | Bond | 166/292 |
| 3,202,214 | 8/1965 | McLaughlin | 166/292 |
| 3,251,414 | 5/1966 | Willman | 166/295 |
| 3,559,737 | 2/1971 | Ralstin et al. | 166/281 |

*Primary Examiner*—Henry C. Sutherland
*Assistant Examiner*—Jack E. Ebel
*Attorney, Agent, or Firm*—John D. Gassett; Paul F. Hawley

[57] ABSTRACT

This concerns the plugging of a highly permeable underground zone penetrated by a well and/or the consolidation of loosely consolidated sand. Formaldehyde is injected through the well into the zone. Thereafter, $H_2S$ is injected. When the $H_2S$ contacts the formaldehyde, a polymer gel is formed in-place in the zone. Relatively high concentrations of formaldehyde and $H_2S$ result in essentially complete plugging of the formation so that it loses essentially all of its permeability. Use of smaller quantities of formaldehyde and hydrogen sulfide results in consolidating loose sand formation, yet permits the sand to retain some permeability so that fluids can flow therethrough.

10 Claims, No Drawings

SUBSURFACE FORMATION TREATMENT

BACKGROUND OF THE INVENTION

1. Field of the Invention

This invention relates to underground permeable formations. It relates especially to a method of injecting formaldehyde and $H_2S$ into the formation to either plug the formation or, in the case of loosely consolidated sand, to consolidate such sand.

2. Setting of the Invention

Oil and gas are produced from underground formations through wellbores drilled from the surface to the formation. The oil and gas are contained in the pores of underground rock or sand which make up the formation. These formations vary and, indeed, it can be said that no two formations are alike. The present invention is useful in connection with two common problems associated with underground formations containing oil and gas.

The first problem concerns secondary or even tertiary recovery of oil or gas from the underground formation. Ordinarily, when an underground formation is first tapped by a well, oil will flow from the formation through the wellbore through a tubing suspended in the wellbore to the surface. After awhile, the pressure in the formation is reduced and artificial means are then introduced to lift the oil to the surface. A common means is the placing of a pump in the wellbore and merely pumping the oil to the surface. However, the pressure in the reservoir eventually is reduced to a point such that the oil is reluctant to leave the formation and flow into the wellbore. Usually, the amount of oil remaining in the reservoir at this stage is at least two-thirds of the oil originally in place. Thus, many systems have been devised to improve ways of recovering portions of this remaining oil. One of the most widely used methods is the so-called waterflooding method whereby water is injected through one wellbore into the formation to force oil toward a second well spaced from the first where the oil is recovered. One of the major problems encountered in the waterflooding for secondary recovery of oil is water breakthrough from the flood front to the producing well relatively early in the displacement process. Rapidly increasing producing water-to-oil ratios follow this initial water breakthrough. This problem results from the injection water channeling or fingering through the oil-bearing formation to the producing well, thus bypassing large zones of the oil-bearing rock. While a more uniform flood front with reduced fingering can be obtained with a displacement fluid having a higher viscosity than water (by adding various water-soluble polymers, such as taught in U.S. Pat. No. 3,386,514), viscous waterflooding alone is not fully effective in all oil formations. Part of the reason is that, although the more viscous aqueous medium (water thickened with polymer, for example) moves more slowly through the higher permeability zone, it is also slower in moving through the less permeable zone where the oil is left.

In normal flooding operations, the ideal situation for maximum recovery of oil is obtained when the driven oil is permitted to build up in a wide bank in front of the driving fluid (water or thickened water), the oil moving uniformly toward the producing well. To keep this bank of oil intact and constantly moving toward the producing well, a substantially uniform permeability must exist throughout the strata. If this uniform permeability does not exist or is not provided, the flooding fluid will seek the area of least resistance (i.e., areas of high permeability) and channeling of the water will occur. Furthermore, as the higher permeability areas become depleted of oil, the water follows these easier flow channels, thus bypassing the space of the rock having higher resistance flow but still containing oil. This increases consumption of the flooding water to the point where the process becomes economically undesirable. It has been found that more uniform flood fronts can be obtained in formations of nonuniform permeability by lowering the permeability of the more permeable strata in the flood zones. Our invention discloses a novel method of obtaining at least partial plugging of such strata.

Many published articles have discussed this problem. Typical of those publications describing the problem and techniques for partially solving it are U.S. Pat. No. 2,747,670, U.S. Pat. No. 3,386,509, and Canadian Pat. No. 898,684.

The second problem with which our invention is concerned is the production of fluid from underground formations having loosely consolidated rocks. That is, the various sand particles in such formations are not strongly attached to each other, and when the fluid is produced, it carries entrained sand with it which causes serious damage to well equipment. In producing oil and gas from such unconsolidated formations some method must be provided to strain the sand inflowing to the well. Numerous methods have been used to combat this problem. One such method is the injection of a fluid through the wellbore into the formation which will cause the particles to adhere to each other. We teach a novel method of consolidating such sand.

BRIEF DESCRIPTION OF INVENTION

In the method of our invention we inject formaldehyde through a well to an underground zone penetrated by a well. We then inject hydrogen sulfide into the zone through the well. A polymer gel is formed in-place in the zone from the reaction of the $H_2S$ contacting the formaldehyde. If we use an adequate concentration of formaldehyde, e.g., at least about 35 percent of the weight of formaldehyde-water solution, and follow that with an adequate injection of $H_2S$, we obtain complete plugging of the formation.

If we wish to merely consolidate "loose" sand particles and yet retain some permeability, we inject much less formaldehyde and/or $H_2S$ into the formation. We teach that for this purpose the formaldehyde concentration should not be over about 5 percent of water-formaldehyde solution.

DETAILED DESCRIPTION OF INVENTION

We will first discuss the use of our invention in plugging highly permeable zones which are found in underground formations which are being waterflooded, as this involves the most widely used application of our invention. In a secondary recovery process, fluid, usually water or water-base, is injected through a well into the formation. This water will take the path of least resistance, which is through the higher permeability zones or portions of the formation. If this is permitted to continue, the oil in the lower permeability part of the formation will not be contacted by the injected fluid and will thus not be recovered. We inject a formaldehyde and water solution into the formation until we have injected the desired amount. The desired amount will be governed by the thickness of the highly permeable section and the degree to which we wish to plug the formation. After we have made this injection, we then inject $H_2S$. The $H_2S$ contacts the formaldehyde and reacts with it to form a polymer gel. It takes about 20 hours for the polymer gel to be formed. It is quite advantageous to use a gas as the second reactant inasmuch as it will finger through the liquid reactant (formaldehyde solution) without displacing it. If plugging is to be obtained, this can be accomplished by having the formaldehyde be at least about 35 percent by weight of the formaldehyde-water solution. A 35 percent HCHO concentration may not be required to achieve complete plugging, but our tests have not yet set the lower limits. The pressure at which these fluids are injected into the formation will be that required to obtain the desired rate of injection to get the desired amount of fluid into the formation. The time for injecting the formaldehyde-water solution is not critical. However, the time in which the $H_2S$ must be injected is that time which will permit the gas to flow through the formaldehyde solution before the polymer gel sets up.

We shall now give an example of a laboratory experiment which we conducted that demonstrates how to form a polymer gel in-place in a sand environment from the reaction of formaldehyde in water and hydrogen sulfide. Arkansas River sand was packed in a 48 mm ID glass tube. This sand has the following sieve analysis:

| Openings, mm | Percent Retained |
|---|---|
| 4.76 | .02 |
| 2.00 | 8.76 |
| .84 | 29.36 |
| .297 | 56.45 |
| .149 | 5.28 |
| .105 | .08 |
| .074 | .02 |
| .044 | .02 |

This sand was consolidated by flowing a 35 percent formaldehyde and water solution into the sand and then slowly bubbling hydrogen sulfide through the solution. The permeability of the sand in the tube at the beginning of the experiment was about 100 Darcies. After the injection of the formaldehyde and water and hydrogen sulfide, the permeability of the sand was only 1 millidarcy. This is essentially plugging the sand.

We also made a polymer gel by merely bubbling hydrogen sulfide through a 35 percent formaldehyde in water solution in a beaker. A C,H,S analysis showed 25.5 percent C, 5.0 percent H, 9.9 percent O, and 59.6 percent S, or an empirical formula of $(C_4H_{10}S_4O)_x$. The polymer was removed from the beaker by heating the bottom and sides until a thin layer of polymer melted around the outside of the plug and the plug slipped out of the beaker. This particular batch of polymer melted at about 230°F to a water-clear, colorless liquid. This suggests that we can unplug any underground formation which may have been plugged using this method by a subsequent injection of a hot fluid such as steam which will melt the polymer gel.

$H_2S$ has a critical pressure of about 1,307 psia at 213°F and of 280 psia at 75°F, for example. If the formation pressure is above the critical pressure of $H_2S$, the $H_2S$ will be in the form of a dense phase not quite like either a liquid or a gas. This viscosity is low compared to the formaldehyde-water solution, so it will finger through the water solution easily; however, it may be desirable to mix $H_2S$ with an inert gas such as nitrogen. The inert gas is added in sufficient amount to decrease the partial pressure of the $H_2S$ gas to a value less than its critical pressure. This mixture then moves to the formation as a gas from which hydrogen sulfide diffuses into the water-formaldehyde solution to form the polymer gel.

As stated above, we can modify our invention to use it to consolidate an unconsolidated formation, yet let that formation contain sufficient permeability so that fluids can flow therethrough. We accomplish this by using lower concentration of formaldehyde in the formaldehyde and water solution and/or by limiting the hydrogen sulfide gas flow through the formaldehyde in the formation. We will now describe a laboratory experiment where this is accomplished. Two hundred forty-five grams of Arkansas River sand, similarly as described above, was placed in a glass column 9.8 cm by 4.2 cm. This sand was measured to have a permeability of 93 Darcies. This sand was then saturated with a 5 percent formaldehyde in water solution. Then $H_2S$ was passed through the piped column of sand at a rate and pressure just sufficient for a bubble to break through every 3 to 10 seconds for 20 hours. At the end of the 20-hour period, $H_2S$ gas flow was then reversed and all the liquid in the column driven out. Sand was left in the beaker in a consolidated state by the polymer formed from the $H_2S$ plus HCHO. The permeability of the consolidated sand left in the beaker was now 33 Darcies. If we wish to merely consolidate loose sand particles and yet retain some permeability, we inject much less formaldehyde and/or $H_2S$ into the formation. For this purpose the formaldehyde concentration should not be over about 5 per cent of water-formaldehyde solution.

We also performed a laboratory experiment that demonstrates that the permeability of a partially plugged sand can be restored by using a solvent extraction. We used the consolidated sand from the experiment just described to perform the following: 100 mls of a 10 percent solution of acetone in water was passed through the consolidated sand, in-place in the original glass tube, under gravity flow in about one-half minute. The sand was then dried by air flow. Seventy mls of extract were recovered. Water and acetone were evaporated from the extract, leaving a white polymer residue, showing that polymer was extracted. The permeability of the sand was 103 Darcies (essentially undisturbed in its original glass tube container). This highly permeable sand still had a sufficient amount of polymer remaining to cement the particles so that the sand could not be shaken out of its original glass tube container. Hydrogen sulfide-formaldehyde polymers are reported also to be soluble in chloroform, bichloroethane, dichloropropane, and toluene.

We have also discovered that the $H_2S$-formaldehyde polymer can be formed in an acid media. A laboratory experiment was performed which shows this. Twenty mls of 35 percent formaldehyde in water solution were placed in a test tube. Thereafter 1 ml of 38 percent HCl was added to the test tube. (About 0.35 gm HCl in solution equals 1.5 weight percent HCl in the total solution.) The $H_2S$ was then bubbled through this solution for 24 hours. A white waxy solid completely filled the test tube.

Sometimes it is desirable to add a stabilizer to the formaldehyde-water solution. A suitable stabilizer is methanol, which typically forms at least about 8.5 percent of the solution by weight.

While the above invention has been described in detail, it is to be understood that various modifications can be made thereto without departing from the spirit or scope of the invention.

We claim:

1. A method of treating a highly permeable underground zone penetrated by a well which comprises:

injecting formaldehyde through said well into said zone;

injecting $H_2S$ into said zone through said well whereby a gel is formed in-place in the zone from the reaction of the $H_2S$ contacting the formaldehyde.

2. A method as defined in claim 1 by which the formaldehyde is injected as at least about 35 percent by weight in a formaldehyde-water solution.

3. A method as defined in claim 1 in which, prior to injection, the said $H_2S$ is mixed with nitrogen.

4. A method as defined in claim 1 which includes a step of adding a stabilizer to the formaldehyde.

5. A method as defined in claim 1 in which a hot fluid is injected into said well to melt at least a part of said gel, and then at least a part of the melted gel is removed.

6. A method as defined in claim 1 in which, at a time after the formation of polymer gel, a 10-percent solution of acetone by weight in water is injected through said well into said zone to dissolve at least a part of the polymer gel to increase the permeability.

7. A method as defined in claim 1 in which the amount of $H_2S$ injected is limited such that sufficient polymer gel is formed to consolidate sand particles of said zone, but insufficient to form complete plugging.

8. A method as defined in claim 2 in which, after the formation of said gel, a solvent is injected through said well into said zone, said solvent selected from the following group: chloroform, dichloroethane, dichloropropane, and toluene.

9. A method of consolidating an unconsolidated underground zone penetrated by a well which comprises:

injecting a formaldehyde water solution, in which the formaldehyde is not over about 5 percent by weight of the solution, through said well into said zone;

injecting $H_2S$ into said zone whereby a polymer gel is formed in situ cementing particles of said zone into a consolidated permeable mass.

10. A method as defined in claim 9 including the step of introducing nitrogen into said $H_2S$ to decrease its partial pressure.

* * * * *